Patented Jan. 13, 1931

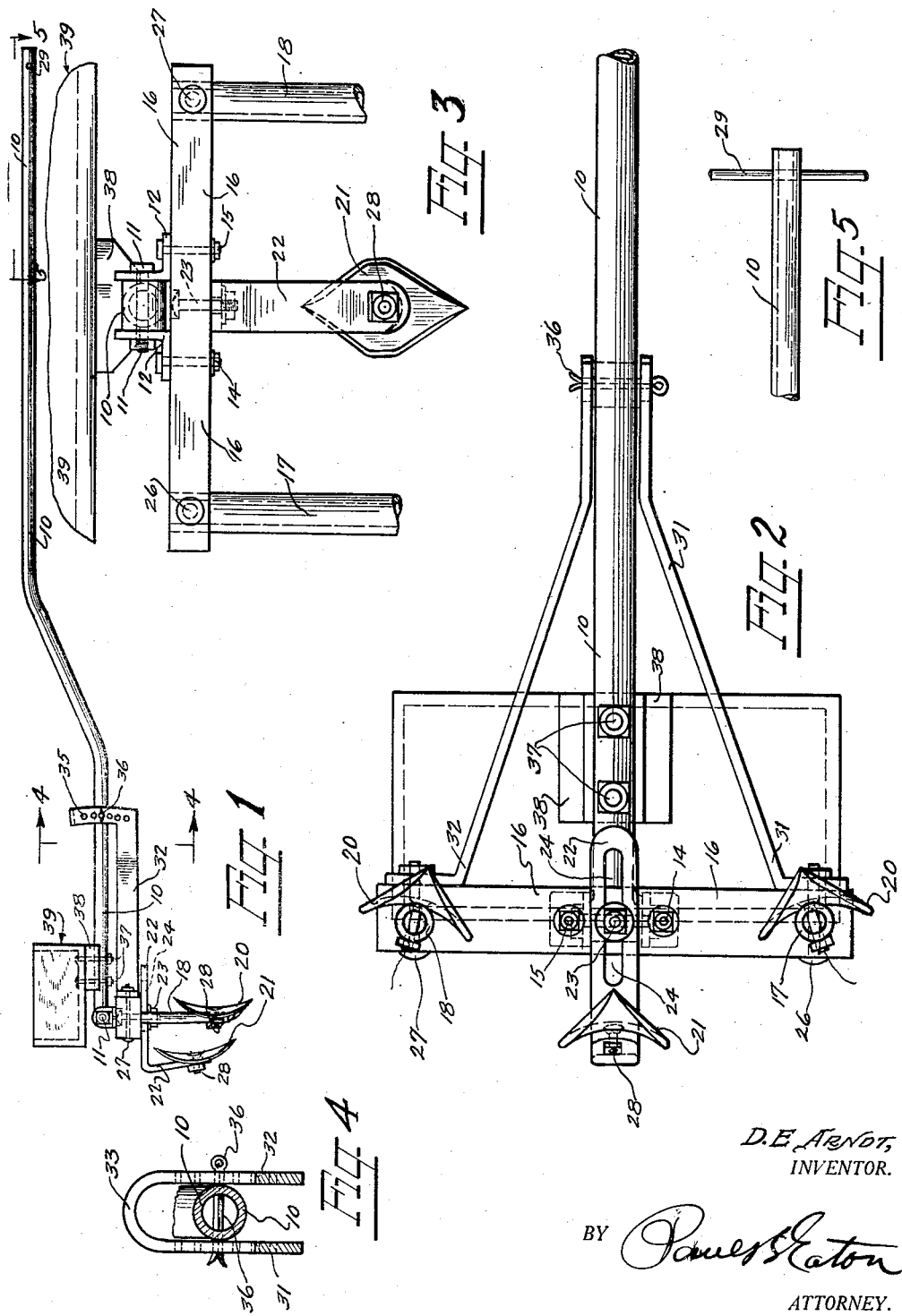

1,788,971

UNITED STATES PATENT OFFICE

DANIEL E. ARNDT, OF WHITNEL, NORTH CAROLINA

HAND PLOW

Application filed March 6, 1930. Serial No. 433,729.

This invention relates to a hand plow and more especially to a hand plow which is adapted to be used as a cultivating tool in several ways. My hand plow is adapted to be used as a cultivating tool when the pitch of the plow is so regulated either by raising the beam or by adjusting the beam with relation to the plow frame as to cause all of the plows to cut approximately the same depth, and I also have provided means whereby the plows can be set so that the two outer plows can form furrows to throw up a ridge with a central plow of less depth of cutting than the other plows so as to open up a furrow in the top of a ridge which will be thrown up by the other two plows, provided the beam is lowered or the plow frame is lowered with relation to the beam so as to cause it to act in this manner.

An object of my invention is to provide a hand plow having on the frame thereof a plurality of plows adapted to be used to cultivate gardens and other small patches and which is adapted to be used for a variety of uses such as cultivating between rows of the patch desired to be cultivated, and also for preparing the land for the planting operation, and also for preparing lists and opening the same for the planting operation.

It is evident from the above description and from a more detailed description which will follow that my hand plow is capable of a variety of uses as will more fully hereinafter appear as the description proceeds.

Some of the objects of my invention having been stated, other objects will appear as the description proceeds, when taken in connection with the accompanying drawings, in which—

Figure 1 is a side elevation of my hand plow;

Figure 2 is a bottom plan view of the rear portion of my plow;

Figure 3 is a rear elevation of a portion of my plow;

Figure 4 is a cross-sectional view taken along the line 4—4 in Figure 1;

Figure 5 is a detail view of the front end of the beam taken along the line 5—5 in Figure 1.

Although it is evident that my plow may have a variety of forms, in the drawings I have shown the plow beam 10 which is pivotally connected by means of the bolt 11 to upstanding lugs 12 and 13, which are secured by means of bolts 14 and 15 to the main cross bar 16. On this cross bar I mount the downwardly projecting feet 17 and 18, and on the bottom of these feet I secure the plows 19 and 20, which are shown in the drawings as having a slight inclination to throw the dirt inwardly toward the central plow 21, which is mounted on the hook member 22, which is adjustably secured to the cross beam by the bolt 23 which is secured in the slot 24, so as to allow rearward and forward adjustment of said plow foot and the plow carried thereby in relation to the cross beam 16.

The feet members 17 and 18 are secured to the cross-beam 16 by means of the bolts 26 and 27. The plow 21 is secured to the foot member 22 by means of the bolt 28. In the front end of the beam portion 10 I provide the cross beam 29 to serve as a handle for holding the same if desired, it being evident that any suitable form of handle may be provided as desired. Secured to the front portion of the cross beam as on the bolts 26 and 27 are the brace members 31 and 32, which are integral with each other at their proximate ends by being formed into the loop portion 33, which loops over the beam 10, and this loop portion has a plurality of holes 35 therein through which a cotter pin 36 or bolt or any other suitable device may be secured for adjustably securing the brace members 31 and 32 and the loop 33 which is integral therewith, to the plow beam 10, so as to adjust the angularity between the cross beam 16 which carries the plow member and the beam 10.

Securely mounted on the beam 10 by means of bolts 37 is a block member 38 on which is secured a box 39 into which suitable weights may be placed for properly weighting the plow frame to cause it to cut the desired depth.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a hand plow, a beam member, a cross beam pivotally secured to said beam member, brace members secured to said cross member and having an adjustable connection with said beam member, a plurality of shovel carrying members secured to said cross beam, one of said shovel carrying members being adjustable rearwardly and forwardly with relation to said cross beam member, a weight box secured to said main beam, and means for adjusting the angularity between said cross beam and said main beam member.

2. An adjustable hand plow comprising a main beam member, a cross beam member pivotally secured to said main beam member, means for adjusting the relation between said main beam member and said cross beam member, two shovels spaced apart from each other and being secured to said cross beam member, a shovel adjustably secured to said cross beam member and being adapted to be adjusted rearwardly and forwardly with relation to said cross beam member, said last named shovel being normally of shorter downward length than the other shovels, said plow being adapted to be used for breaking and having all shovels cut at the same depth when adjusted in proper position, and being adapted to have the middle shovel member cut a shallower depth with the two outer shovels acting as to throw up a ridge, and the central plow being adapted to open out a furrow in said ridge when set at the proper angle with relation to the main beam.

In testimony whereof I affix my signature.

DANIEL E. ARNDT.